US009357409B2

(12) United States Patent
Das et al.

(10) Patent No.: US 9,357,409 B2
(45) Date of Patent: May 31, 2016

(54) SYSTEM LEVEL EMULATION OF TD-SCDMA WIRELESS NETWORKS

(71) Applicant: Azimuth Systems, Inc., Action, MA (US)

(72) Inventors: Deepak Das, Arlington, MA (US); Nandish Chalishazar, Nashua, NH (US); Pattabhi Cherukuri, Malden, MA (US); Volkan Sevindik, Wellesley Hills, MA (US)

(73) Assignee: AZIMUTH SYSTEMS, INC., Acton, MA (US)

( * ) Notice: Subject to any disclaimer, the term of this patent is extended or adjusted under 35 U.S.C. 154(b) by 253 days.

(21) Appl. No.: 14/033,015

(22) Filed: Sep. 20, 2013

(65) Prior Publication Data

US 2014/0086079 A1   Mar. 27, 2014

Related U.S. Application Data

(60) Provisional application No. 61/703,893, filed on Sep. 21, 2012.

(51) Int. Cl.
*H04W 4/18* (2009.01)
*H04W 24/06* (2009.01)
*H04W 16/22* (2009.01)

(52) U.S. Cl.
CPC .............. *H04W 24/06* (2013.01); *H04W 16/22* (2013.01)

(58) Field of Classification Search
None
See application file for complete search history.

(56) References Cited

U.S. PATENT DOCUMENTS

| | | | |
|---|---|---|---|
| 7,508,868 B2* | 3/2009 | Chang | 375/224 |
| 7,523,190 B1* | 4/2009 | Bickerstaff | H04L 41/0873 707/999.003 |
| 2004/0162061 A1* | 8/2004 | Abrol et al. | 455/414.1 |
| 2011/0256863 A1* | 10/2011 | Ramasamy et al. | 455/424 |
| 2014/0086079 A1* | 3/2014 | Das | H04W 24/06 370/252 |
| 2015/0237580 A1* | 8/2015 | Yu | H04W 52/0229 370/311 |

* cited by examiner

*Primary Examiner* — Fan Ng
(74) *Attorney, Agent, or Firm* — Anderson Gorecki & Rouille LLP (57) ABSTRACT

A wireless network emulation system undersamples log files when the conditions represented in the log files would require a faster refresh rate than the channel emulator can provide. A representative sample may be selected based on number of channel taps, delay spread, maximum value, or being first, last or otherwise identifiable within a group. The RF information from the selected sample is utilized as being representative of a group of related samples for a given time period corresponding to the refresh rate of the channel emulator.

24 Claims, 6 Drawing Sheets

SYSTEM LEVEL EMULATION OF TD-SCDMA WIRELESS NETWORKS

CROSS-REFERENCE TO RELATED APPLICATIONS

Priority is claimed to U.S. Provisional Patent Application 61/703,893, entitled ALGORITHM FOR UNDER SAMPLING THE TD-SCDMA PACKET FOR SYSTEM LEVEL EMULATION OF WIRELESS NETWORKS, filed Sep. 21, 2012, which is incorporated by reference.

BACKGROUND OF THE INVENTION

Aspects of the disclosure are generally related to test equipment, and more particularly to system level wireless network emulation. Cellular networks and Wireless Local Area Networks ("WLANs") enable communications between mobile wireless devices and fixed location wireless devices. It is generally desirable to test the performance of the devices under various network conditions as part of the product design process. However, testing wireless devices in an open environment is notoriously difficult because wireless communications can be affected by ambient sources of external electromagnetic interference (EMI). It is now relatively common to use emulation systems to perform wireless device testing in a controlled environment such as a lab. One type of emulation system includes a separate container for each wireless device which shields against EMI. The shielded containers are placed in communication via cabling. Communications between devices are converted from wireless radio frequency (RF) to wired signals which are transmitted via the cabling. A channel emulator connected between the devices and their containers subjects the communications to simulated physical environmental effects while observations are recorded. Various types of tests can be performed with the channel emulator. For example, a test can be designed to create hypothetical conditions or recreate real conditions. One type of realistic test is system level network emulation. In system level network emulation the system level conditions of a wireless network are recorded and subsequently recreated in the lab using the channel emulator. However, adapting system level network emulation for certain types of devices and protocols can be problematic.

SUMMARY OF THE INVENTION

According to an aspect of the invention, a method comprises: using at least one computer, loading at least one log file which represents wireless network conditions; for a selected frequency, loading a group of time slots from at least one log file corresponding to a predetermined time period; selecting one of the loaded time slots; using radio frequency information associated with the selected time slot to represent the group of time slots; generating a playback file which represents the network conditions based on the radio frequency information selected to represent the group of time slots; and setting resources of a channel emulator based on the playback file to recreate the wireless network conditions.

According to another aspect of the invention, an apparatus comprises: a computer which: loads at least one log file which represents wireless network conditions; for a selected frequency, loads a group of time slots from the at least one log file corresponding to a predetermined time period; selects one of the loaded time slots; uses radio frequency information associated with the selected time slot to represent the group of time slots; and generates a playback file which represents the network conditions based on the radio frequency information selected to represent the group of time slots; and a channel emulator which sets resources of a channel emulator based on the playback file to recreate the wireless network conditions.

According to another aspect of the invention a computer program stored on non-transitory computer-readable memory comprises: logic which loads at least one log file which represents wireless network conditions; logic which, for a selected frequency, loads a group of time slots from the at least one log file corresponding to a predetermined time period; logic which selects one of the loaded time slots; logic which uses radio frequency information associated with the selected time slot to represent the group of time slots; logic which generates a playback file which represents the network conditions based on the radio frequency information selected to represent the group of time slots; and logic which sets resources of a channel emulator based on the playback file to recreate the wireless network conditions.

One advantage of using radio frequency information associated with a selected time slot to represent the group of time slots is enabling playback file generation and simulation when the conditions represented by the log files would require a faster refresh rate than the channel emulator can provide. Other features and advantages will be apparent from the detailed description.

DETAILED DESCRIPTION

Figure 1:
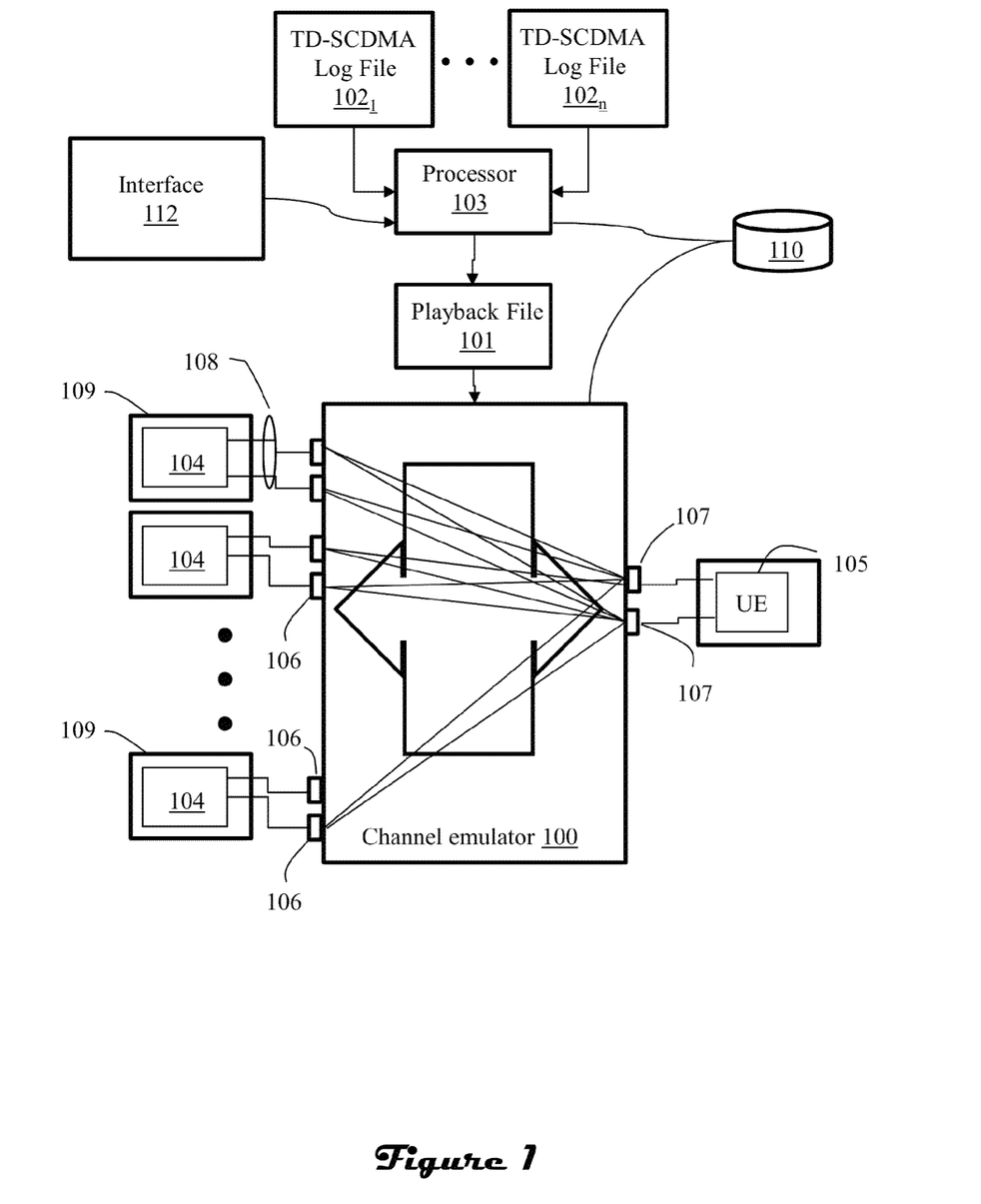
FIG. 1 illustrates a channel emulator for testing wireless devices in a controlled environment.

FIG. 1 illustrates an emulation system for performing wireless device testing in a controlled environment. A set of two or more wireless devices including base stations 104 and user equipment (UE) 105 are shown interconnected via a channel emulator 100. However, a wide variety of wireless devices might be used, including but not limited to wireless phones, portable computers, base stations, base station controllers, and diagnostic monitors. The wireless devices may be disposed in separate housings 109 which provide shielding from external EMI. Cabling 108 is employed in place of antennas to connect the housed wireless devices to ports on the channel emulator 100. In the illustrated example, each port 106 is associated with a particular antenna port of the base station 104 to which it is connected by a cable, and each port 107 is associated with a particular antenna port of the UE 105 to which it is connected by a cable. The channel emulator 100 subjects signals transmitted between the interconnected devices to simulated network conditions while operation of the devices is recorded. Consequently, the channel emulator can create simulated network conditions in a controlled environment.

The channel emulator simulates network conditions by selectively modifying signals transmitted between the interconnected devices in accordance with a playback file. Shared resources such as digital signal processors and attenuators in the channel emulator are adjusted as indicated by a playback file. The playback file includes shared resource settings for a given frequency which represent effects such as multipath reflections, delay spread, angle of arrival, power angular spread, angle of departure, antenna spacing, antenna geometry, Doppler from moving vehicle, Doppler from changing environments, path loss, shadow fading effects, reflections in clusters and external interference such as radar signals, phone transmission and other wireless signals or noise. The playback file may also indicate conditions such as number of available sectors and pilot signals, power of pilot signals, received power levels, signal-to-noise-plus-interference ratio (SNIR), and hand-off situations. The settings can be used to create simulated conditions to evaluate performance metrics such as average sector throughput, average delay, average network throughput, the performance of different traffic types such as best effort (BE), expedited forwarding (EF), and assured forwarding (AF).

Figure 2:
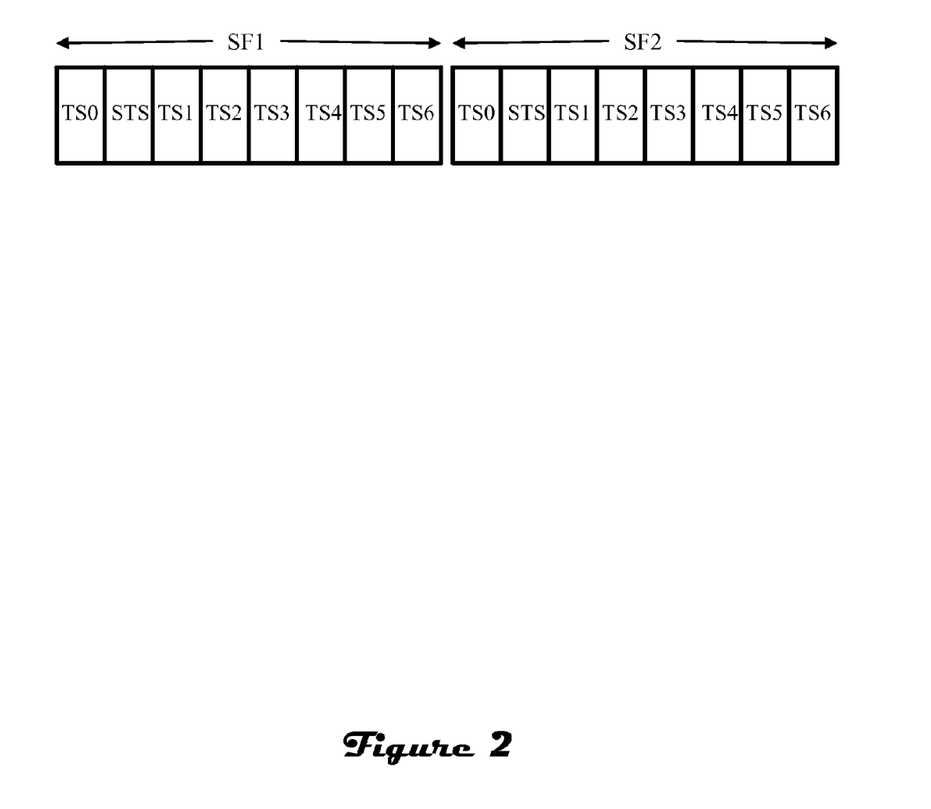
FIG. 2 illustrates a basic TD-SCDMA structure.

Referring to FIGS. 1 and 2, the simulated network conditions specified by the playback file can be a recreation of real network conditions recorded on one or more log files $102_1$ through $102_n$ by devices such as user terminals (UEs), diagnostic monitors (DMs), base stations (BSs), next generation evolved base stations (eNodeBs), and base station controllers operating in a real telecommunication network, e.g., a Time Division Synchronous Code Division Multiple Access (TD-SCDMA) network. A basic TD-SCDMA structure is shown in FIG. 2. Every sub-frame SFn has seven time slots TSi. TS0 is always designated for downlink transmission and TS1 is always designated for uplink transmission. The other time-slots TS2 through TS6 are used to carry data as configured by the network. TD-SCDMA devices may monitor and decode different frequencies at different time-slots from different sectors of the network. Consequently, the log files may include parameters such as received signal code power (RSCP), power delay profile (PDP), and channel tap power for each of these frequencies for different sectors in different time-slots, and the parameters may change on a per-time-slot basis. The data recorded in the log files can also contain network performance indicators including but not limited to one or more of cell information, sector information, location information, data rate, throughput, wireless channel signal quality, and handoff parameters. The playback file 101 is created from the log files $102_1$ through $102_n$ by program code which is stored on non-transitory computer-readable memory 110 and runs on a processor 103.

Figure 3:
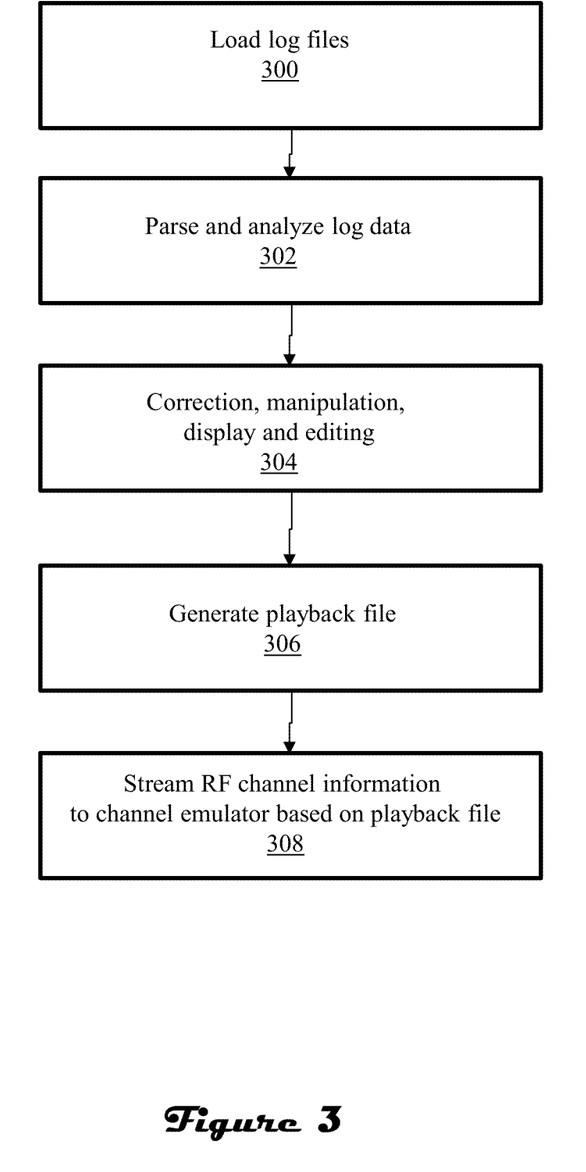
FIG. 3 illustrates aspects of the program code which generates the playback file from the log files.

FIG. 3 illustrates aspects of the program code which generates the playback file from the log files. Initially, the log file or log files are loaded into the playback file generation software in step 300. The software then parses and analyzes the data in the log files in step 302. For example, specific types of events and gaps in the recorded data can be recognized. An event may be any situation, signal or feature that can be characterized by recognizable properties, including but not limited to a call drop, handover, period during which capacity, QoS or coverage is sub-optimal, where resource management issues occur, where unique modulation, channel quality information (CQI) power measurement, reporting, or resource block distribution patterns occur. The events may be organized and gaps filled in order to generate a practical test as indicated by step 304. Further, external input may also or alternatively be provided via interface 112 (FIG. 1). For example, an operator may manipulate the data to achieve a more practical or useful test. The software then creates the playback file which represents the network performance indicators in terms of shared resource settings as indicated in step 306. The playback file may include representations of parameters from the log files. The data in the playback file is streamed to the channel emulator in order to perform a test as indicated in step 308.

Figure 4:
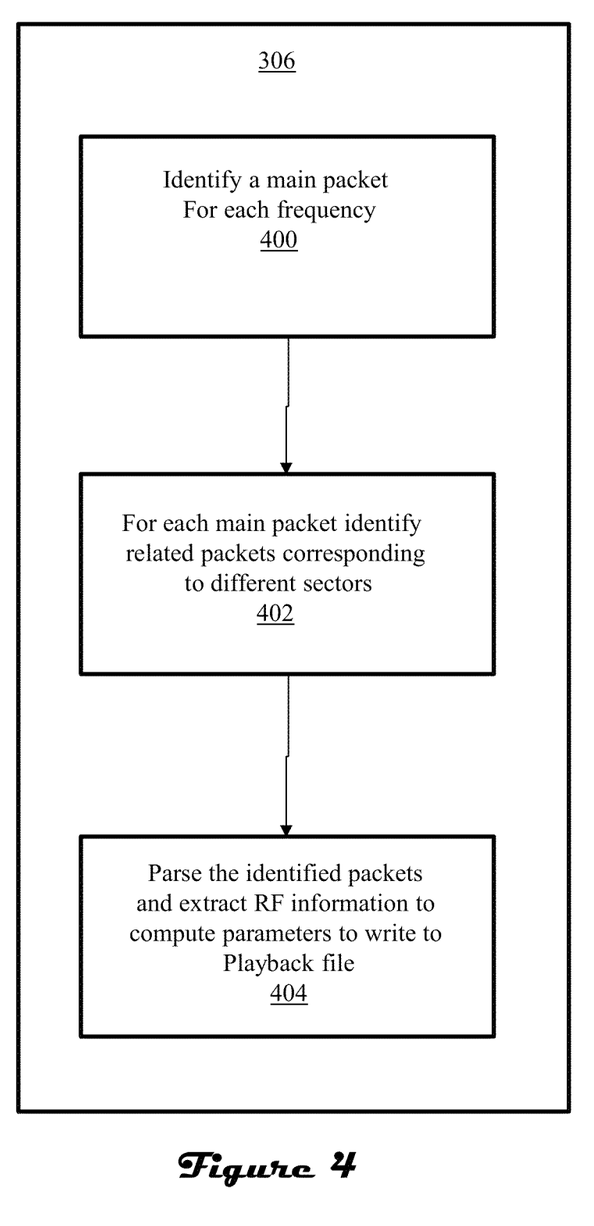
FIG. 4 illustrates aspects of playback file generation for a given frequency in a TD-SCDMA network in greater detail.

FIG. 4 illustrates aspects of playback file generation 306 (FIG. 3) for a given frequency in a TD-SCDMA network in greater detail. The first step 400 of playback file generation for a TD-SCDMA network is to identify a main packet for each frequency. In particular, a separate main packet is selected for each frequency in the simulation. Next, for each identified main packet the related packets corresponding to different sectors are identified in step 402. The identified groups of packets are then parsed and the RF information extracted to compute parameters to write to the playback file in step 404.

Figure 5:
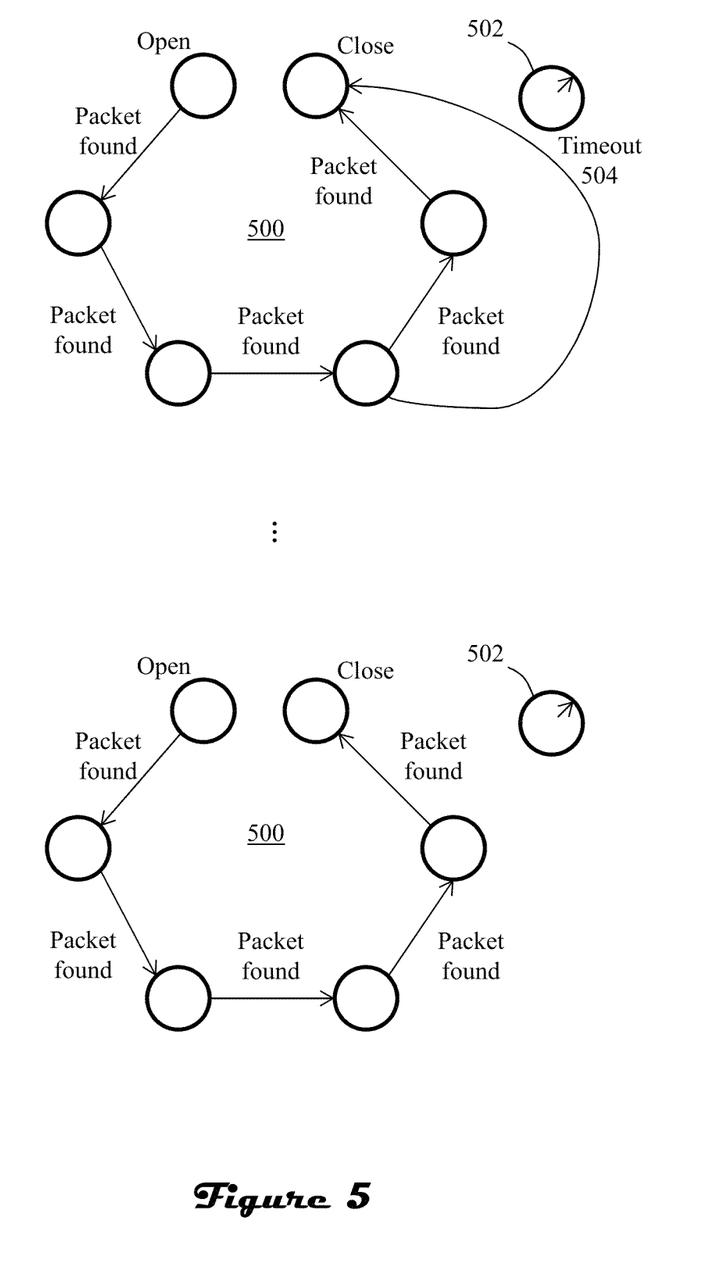
FIG. 5 illustrates aspects of identifying related packets in greater detail.

FIG. 5 illustrates aspects of identifying related packets 402 (FIG. 4) in greater detail. State machines 500 are used to determine when all related packets have been processed. A new state-machine is instantiated each time a main packet is identified 400 (FIG. 4). At any given time there will generally be multiple state machines in operation to account for multiple main packets having related packets that have not all completely been processed. Each of these state-machines transition to the next state only when the next related RF information packet is found. The state machine is closed when all related RF information packets have been found and processed. In order to avoid have a state-machine hanging infinitely or for an unacceptably long time in anticipation of an expected related RF information packet that may have been lost or corrupted during the recording process, a new countdown timer 502 is initialized and associated with each new state-machine. If the state machine has not reached the end state when the associated countdown timer expires (timeout 504) then the state-machine is forced to close.

Referring again to FIG. 1, it is possible that the TD-SCDMA RF related information or packets recorded in the log files occur more frequently than the resources of the channel emulator can play back. The hardware and software of the emulation system is characterized by a refresh rate, e.g., 10 ms, indicative of how frequently settings can be changed. The refresh rate defines corresponding time periods during which the shared resources of the channel emulator remain in the previously set playback state. A main packet could be grouped with related RF information packets as described above such that the number of related packets depends on the number of sectors having RF information captured in the log files, and multiple instances of such grouped packets may occur within the same time period. The grouped packets can have information associated with different sectors or the same sector. For the duration of each refresh rate/time period, a union of all the unique sectors RF information is considered for the purposes of playback. Criteria for picking a smaller subset of RF sectors for playback among this union list could be based on power (e.g. RSCP), channel quality (e.g Ec/Io) etc. In the case where there are multiple occurrences of RF information pertaining to the same sector within the time period which defines operation of the emulation system, a single meaningful representative RF information is computed or selected for that sector during that time period.

Figure 6:
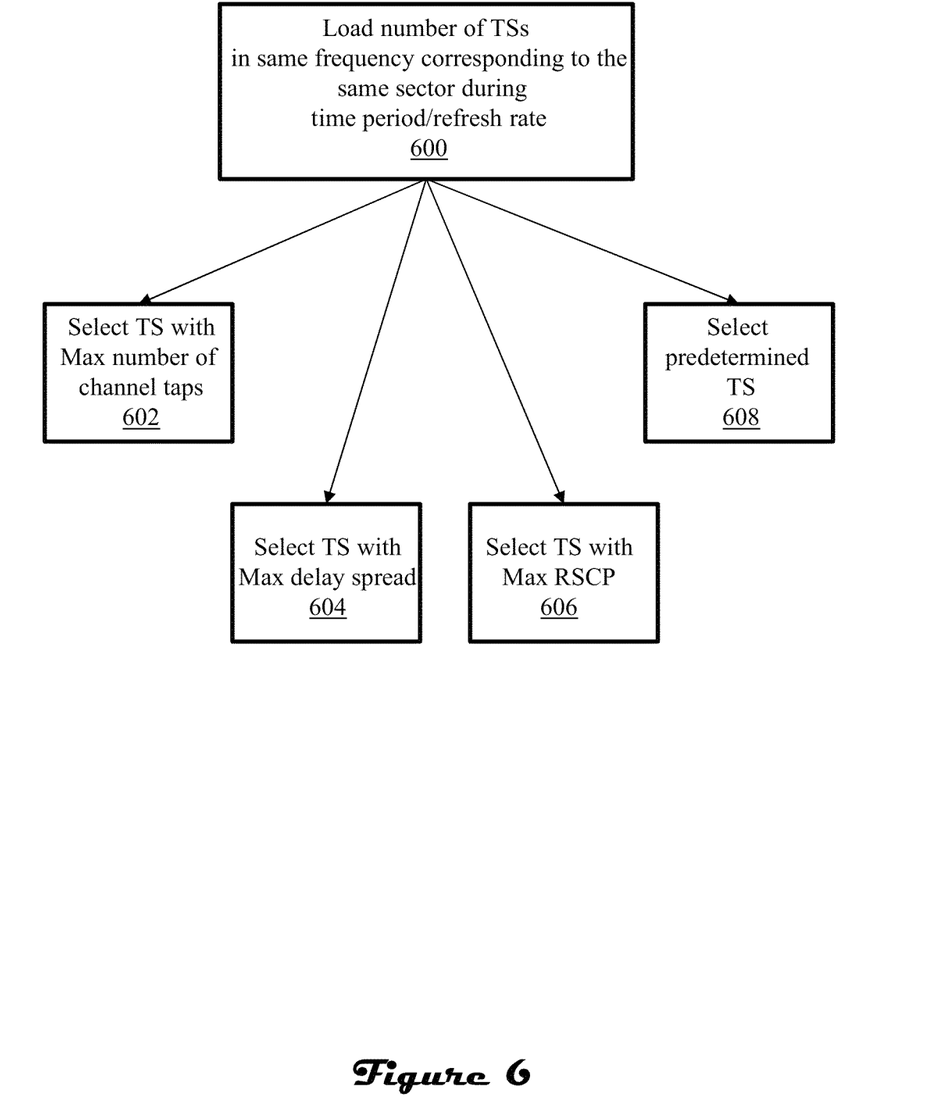
FIG. 6 illustrates aspects of adapting the information in the logs to the rate of playback in order to extract RF information to compute parameters to write to the playback file in greater detail.

FIG. 6 illustrates aspects of selecting a single RF information in scenarios where there are multiple occurrences of RF information pertaining to the same sector. A representative value among the multiple RF information values for the same sector is then selected in accordance with one or more techniques which may be selected by a user or automatically selected. Further, the techniques may be used in combination as determined by logical operations. One technique 602 is to select the time slot having the maximum number of channel taps. In other words, the data for which the most copies were received due to multipath reception is selected. Another technique 604 is to select the time slot having the maximum delay spread. In other words, the data for which the greatest amount of time Δt between copies received due to multipath reception is selected. Another technique 606 is to select the time slot characterized by the maximum value, e.g., max RSCP value in dBm. Another technique 608 is to select a specific time slot, e.g., the first or last time slot. The RF information from the selected time slot is then utilized as being representative of that sector for that time period as indicated in step 610.

Various aspects may be implemented, at least in part, via a computer program product stored in a non-transitory machine-readable storage medium such as, for example, a non-transitory computer-readable medium, for execution by, or to control the operation of, data processing apparatus, e.g., a programmable processor, a computer, or multiple computers. Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

While the invention is described through the above exemplary embodiments, it will be understood by those of ordinary skill in the art that modifications and variations may be made without departing from the inventive concepts. Further, while the embodiments are described in connection with various illustrative structures, one skilled in the art will recognize that the system may be embodied in connection with other structures. Accordingly, the invention should not be viewed as limited except by the scope and spirit of the appended claims.

What is claimed is:

1. A method comprising:
using at least one computer,
loading at least one log file which represents wireless network conditions;
for a selected frequency, loading a group of time slots from the at least one log file corresponding to a predetermined time period based on an emulation resource setting refresh rate;
selecting one of the loaded time slots;
using radio frequency information associated with the selected time slot to represent the group of time slots;
generating a playback file which represents the network conditions based on the radio frequency information selected to represent the group of time slots; and
setting resources of a channel emulator based on the playback file to recreate the wireless network conditions.

2. The method of claim 1 in which selecting one of the loaded time slots includes selecting a time slot having a maximum number of channel taps of the group of time slots.

3. The method of claim 1 in which selecting one of the loaded time slots includes selecting a time slot having a maximum delay spread of the group of time slots.

4. The method of claim 1 in which selecting one of the loaded time slots includes selecting a time slot characterized by a maximum received signal code power value of the group of time slots.

5. The method of claim 1 in which selecting one of the loaded time slots includes selecting a specific predetermined time slot of the group of time slots.

6. The method of claim 1 in which loading the group of time slots from the at least one log file corresponding to the predetermined time period includes associating a state machine with the group and advancing between states as each additional time slot of the group is identified.

7. The method of claim 6 including closing the state machine when all related time slots have been identified.

8. The method of claim 6 including associating a timer with the state-machine and closing the state machine when the timer expires.

9. A computer program stored on a non-transitory computer-readable medium comprising:
logic which loads at least one log file which represents wireless network conditions;
logic which, for a selected frequency, loads a group of time slots from the at least one log file corresponding to a predetermined time period based on an emulation resource setting refresh rate;
logic which selects one of the loaded time slots;
logic which uses radio frequency information associated with the selected time slot to represent the group of time slots;
logic which generates a playback file which represents the network conditions based on the radio frequency information selected to represent the group of time slots; and
logic which sets resources of a channel emulator based on the playback file to recreate the wireless network conditions.

10. The computer program of claim 9 in which the logic which selects one of the loaded time slots selects a time slot having a maximum number of channel taps of the group of time slots.

11. The computer program of claim 9 in which the logic which selects one of the loaded time slots selects a time slot having a maximum delay spread of the group of time slots.

12. The computer program of claim 9 in which the logic which selects one of the loaded time slots selects a time slot characterized by a maximum received signal code power value of the group of time slots.

13. The computer program of claim 9 in which the logic which selects one of the loaded time slots selects a specific predetermined time slot of the group of time slots.

14. The computer program of claim 9 in which the logic which loads the group of time slots from the at least one log file corresponding to the predetermined time period includes logic which associates a state machine with the group and advances between states as each additional time slot of the group is identified.

15. The computer program of claim 14 including logic which closes the state machine when all related time slots have been identified.

16. The computer program of claim 14 including a timer associated with the state-machine and logic which closes the state machine when the timer expires.

17. Apparatus comprising:
a computer comprising a memory to store executable instructions; and a processor, coupled to the memory, that facilitates execution of the executable instructions to perform operations such that the computer:
loads at least one log file which represents wireless network conditions;
for a selected frequency, loads a group of time slots from the at least one log file corresponding to a predetermined time period based on an emulation resource setting refresh rate;
selects one of the loaded time slots;
uses radio frequency information associated with the selected time slot to represent the group of time slots; and
generates a playback file which represents the network conditions based on the radio frequency information selected to represent the group of time slots; and
a channel emulator which sets resources based on the playback file to recreate the wireless network conditions.

18. The apparatus of claim 17 in which the computer selects a time slot having a maximum number of channel taps of the group of time slots.

19. The apparatus of claim 17 in which the computer selects a time slot having a maximum delay spread of the group of time slots.

20. The apparatus of claim 17 in which the computer selects a time slot characterized by a maximum received signal code power value of the group of time slots.

21. The apparatus of claim 17 in which the computer selects a specific predetermined time slot of the group of time slots.

22. The apparatus of claim 21 in which the computer closes the state machine when all related time slots have been identified.

23. The apparatus of claim 21 including a timer associated with the state-machine and wherein the computer closes the state machine when the timer expires.

24. The apparatus of claim 17 in which the computer associates a state machine with the group and advances between states as each additional time slot of the group is identified.

* * * * *